Jan. 12, 1965    E. H. DALGLEISH    3,165,333
ADJUSTABLE PASSENGER SAFETY GUARD
Filed Feb. 12, 1963    2 Sheets-Sheet 1
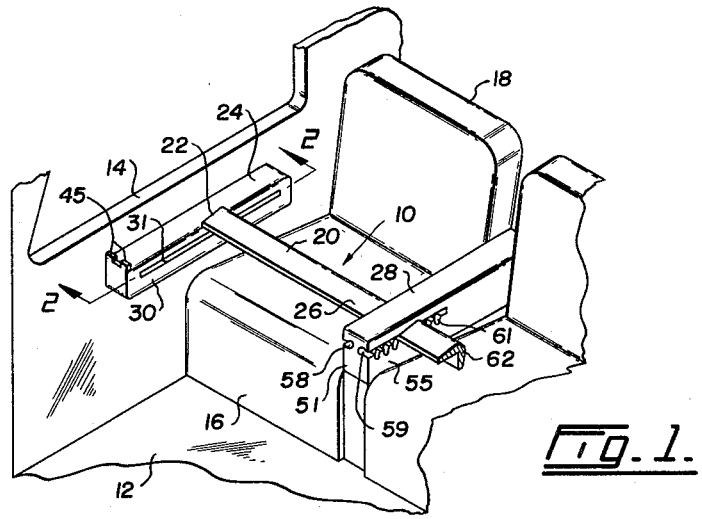
*Fig. 1.*
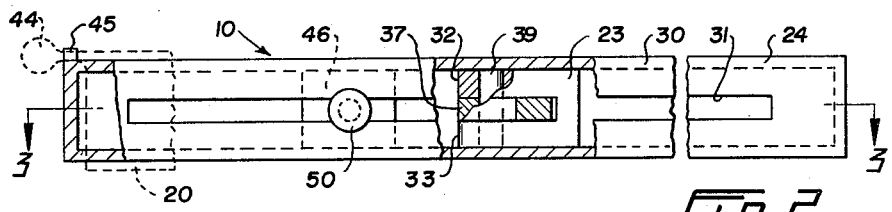
*Fig. 2.*
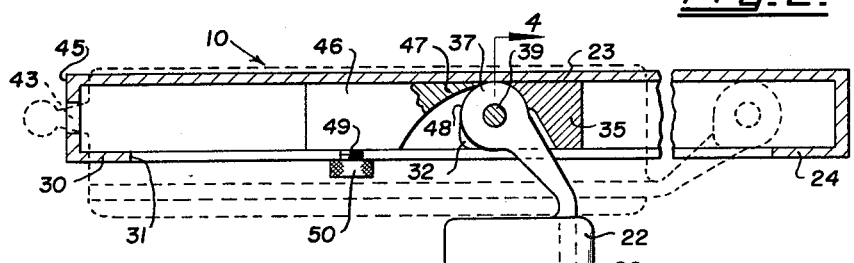
*Fig. 3.*
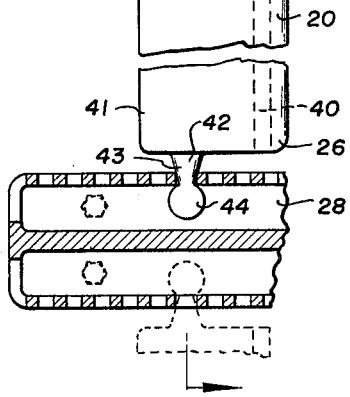
INVENTOR
EARL H. DALGLEISH
BY
Featherstonhaugh & Co.
ATTORNEYS Jan. 12, 1965  E. H. DALGLEISH  3,165,333
ADJUSTABLE PASSENGER SAFETY GUARD
Filed Feb. 12, 1963  2 Sheets-Sheet 2

INVENTOR
EARL H. DALGLEISH
BY
Fetherstonhaugh & Co.
ATTORNEYS

United States Patent Office 3,165,333
Patented Jan. 12, 1965

3,165,333
ADJUSTABLE PASSENGER SAFETY GUARD
Earl H. Dalgleish, 725 Biddesden Place, West Vancouver, British Columbia, Canada
Filed Feb. 12, 1963, Ser. No. 257,936
8 Claims. (Cl. 280—150)

This invention relates to a safety guard adapted to hold a passenger seated in a vehicle from being thrown forwardly when the vehicle comes to an unexpected stop. It is a safety guard especially adaptable for use in automobiles.

A main object of the invention is to provide a guard, which is sufficiently strong enough not only to restrain a passenger from forward movement, but which will hold a door of the vehicle to which the invention may be connected closed in the event of a collision or if the automobile should roll.

Another object is to provide a safety guard as shown which is convenient to use and which may be adjusted to passengers of different sizes and which is capable of being released quickly. Many attempts have been made to produce safety guards which will attain all of the above objects, but which have in the main been unsuccessful. Certain safety guards which have been produced, especially those of the strap type, usually lie in heaps on the seat of the vehicle or automobile and, therefore, detract from the interior beautification of the automobile. They are very inconvenient to use as they tend to slide down between the seat and the seat back. Others of the solid or extensible bar type are usually inconvenient to use and do not provide utmost passenger safety.

The present invention seeks to overcome the drawbacks above by providing a passenger safety guard of the rigid bar type which, when in its normal closed position, will appear to be nothing more or less than and will serve as an arm rest, and which can be swung into its normal operating position horizontally to the seat without any inconvenience to the passenger. The present invention also provides a safety guard which will also enhance the interior beautification of the automobile.

The present invention consists of an adjustable passenger safety guard for a vehicle comprising an elongated horizontally disposed housing being adapted to be mounted on an inner side wall of said vehicle adjacent a seat thereof in a fore and aft position, a runner in said housing longitudinally slidable therein, means to releasably secure the runner in any selected longitudinal position in the housing against forward movement relative thereto, a safety bar pivotally connected at one end to the runner, said safety bar being adapted to lie in a position parallel to and releasably secured against forward movement above said seat in a normal open position by a restraining arm which releasably engages the other end of the safety bar, and adapted to be swung forwardly against and parallel to the side wall when not in use, and also includes a door safety means whereby the restraining arm restrains the safety bar from movement in a direction normal to the side wall. In the disclosure and claims following when reference is made to a side wall it shall also mean a door.

An example of this invention is illustrated in the accompanying drawings, in which:

FIGURE 1 is an isometric view of the inside of an automobile partially cut away to show the interior thereof, and the safety guard disposed in its normal operating position;

FIGURE 2 is a sectional view taken along line 2—2 of FIGURE 1;

FIGURE 3 is a sectional view taken along line 3—3 of FIGURE 2;

Figure 4:
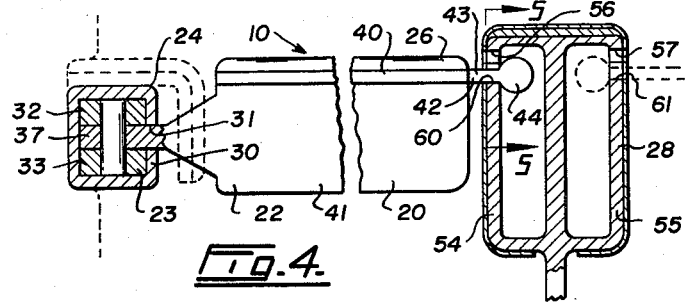
FIGURE 4 is a sectional view taken along line 4—4 of FIGURE 3.

Referring to the drawings, 10 generally represents the safety guard device as it would appear in its normal operating position mounted in an automobile 12 having a side door 14, a seat 16 and seat back 18. As shown in FIGURE 1, the safety guard device consists essentially of a safety bar 20 hingedly secured at its outer end 22 to a runner 23, contained in an elongated housing 24, the free end 26 of the safety bar 20 being adapted in its operating position to be restrained from forward movement, as hereinafter described, by a restraining arm 28.

It will be noted by referring to FIGURE 1, that the housing 24 is mounted in a substantially fore and aft position on the side door 14 of the automobile and slightly above the seat 16 thereof, preferably by welding to the door 14. The housing is preferably constructed of steel for strength and opens outwardly on one side into the body of the automobile 12, said open side being covered with a cover plate 30, said cover plate having a longitudinally disposed slot 31 formed therein.

The runner 23 which is also preferably constructed of metal, for strength, is suitably dimensioned so that it has a slidably snug fit within the housing 24. By referring to FIGURE 2 and FIGURE 3, it will be seen that the runner is constructed in the form of a clevis having spaced upper and lower legs 32 and 33 respectively, spaced apart by a base 35. The outer end 22 of the safety bar 20 has an eye 37 in said outer end and is pivotally connected to the runner 23 by a pin 39 passing through the upper and lower legs 32 and 33 respectively, and through the eye 37, the pivotal connection permitting the safety bar 20 to be swung forwardly to a position parallel with the side door 14 of the automobile and to be swung outwardly and away from said side door to a position parallel to and above the seat 16. It will also be seen that the safety bar 20 protrudes outwardly of the housing through the slot 31 in the cover plate 30, relative to the said housing, said safety bar may be positioned at various distances from the seat back 18 as desired.

In the preferred form that portion of the safety bar 20 outwardly of the housing 24 is an angular member having a vertical leg 40 and a horizontal leg 41. A knob projection 42 having a shank 43 and a knob 44 is suitably secured to or formed on the said horizontal leg at the free end 26 of the safety bar. The horizontal leg 41 is adapted when the safety bar is swung inwardly to a position parallel with the side door, to lie above the housing 24, the vertical leg 40 lying flush against the cover plate 30. The bar is releasably secured in this position and against fore and aft movement by the shank 43 of the knob, projection 42 being held between a pair of spaced upwardly projecting lugs 45 secured to the top of the housing 24 at the forward end thereof.

In order to selectively secure the runner 23 against forward movement relative the housing, a wedging block 46 having a wedging tongue 47 is positioned in the housing 24 forwardly of the runner 23, the wedging tongue being adapted to coact with the forward face 48 of the runner 23, which has been suitably shaped, to thereby jam the runner within the housing to thereby restrain forward movement. The wedging block 46 which is also snugly slidable within the housing has a shaft 49 suitably connected thereto and protruding outwardly of the slot 41 in the cover plate 30. A small handle 50, which in this particular form of the invention is a small chrome covered knob having a threaded recess, is secured to the protruding threaded end of the shaft 49 and provides a means whereby the wedging block 46 may be positioned in any desired position in the housing 24.

The restraining arm 28 to which, as has been hereinbefore described, the free end 26 of the safety bar is secured, is disposed in a fore and aft direction above the seat 16 and substantially centrally thereof. In many automobiles the restraining arm may be mounted so that it is fixed, however, it may also be hingedly mounted to permit it to be swung upwardly from the seat and backwardly against the seat back when not in use. In the preferred form, being shown in FIGURES 1 and 4, in which the arm is fixedly mounted, the arm is a box member having a forwardly opening end 51 and having a flanged lower portion 52 which, as shown in FIGURE 4, is bolted to a cross member 53 of the automobile. The opposite sides 54 and 55 of the box member are slotted longitudinally by main slots 56 and 57 respectively, having forwardly opening ends 58 and 59 respectively. A plurality of branch slots 60 and 61 are also formed in the opposite sides 54 and 55 respectively, and extend downwardly and forwardly from main slots 56 and 57, respectively.

The restraining arm as described is designed to serve as a restraining means for the free end 26 of the safety bar 20 and as a means to restrain a similar safety bar, a fragmentary portion of which is shown in FIGURE 1 and numbered 62 which is mounted on the opposite side of the automobile from safety bar 20, the free end 26 of safety bar 20 being restrained by branch slots 60 in side 59 and the safety bar 62 being restrained by branch slots 61 in side 55.

Figure 5:
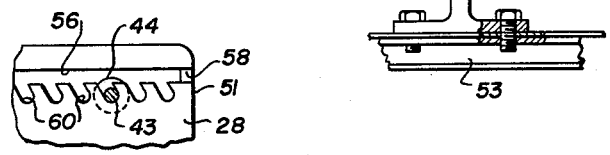
FIGURE 5 is a fragmentary sectional view of an embodiment of the invention taken along line 5—5 of FIGURE 4.

In operation, the described safety guard device is extremely convenient to use and very easy to operate as it does not require a passenger to move his position or to open the door of the automobile in order to either set the bar in a safety position or to return it to the side of the automobile. By referring to FIGURES 1, 2 and 3, it will be seen that when the safety bar 20 is disposed in a position parallel of the side door 14 of the automobile, its outer end 22 lies in a rearmost part of the housing 24. The passenger therefore simply has to swing the free end 26 outwardly away from the side door 14, and move the runner forwardly in the housing 24. The knobbed projection 42 of the free end of the safety bar is then drawn backwardly through main slot 56 in the restraining arm, and then inserted into any desired branch slot 60. It will be noted by referring to FIGURE 3, that the shank 43 of the knobbed projection fits snugly within the branch slot 60, the knob 44 engaging the inner side of the opposing side 54 of the restraining arm 28, thereby preventing lateral movement of the safety arm 20 relative to said restraining arm. The wedging block 46 may then be forced against the runner, the wedging tongue 47 jamming the runner thereby securing it against forward movement. When it is desired to return the safety bar 20 to the side 14 of the automobile, the foregoing procedure is simply reversed. As clearly illustrated in FIGURES 3, 4 and 5, the safety bar 20 in its engaged position with the restraining arm not only serves to prevent a passenger from being thrown forwardly, if the automobile should come to a sudden stop, but will prevent the door 14 opening outwardly due to the engagement of the knob 44 with the side 54 of the restraining arm and will also serve as an additional stiffener for the door preventing it from being forced inwardly. It is preferred that the safety bar and restraining arm be suitably padded with a resilient shock absorbing material, such as rubber or foam plastic, to thereby decrease the chance of passenger injury and to serve as comfortable arm rests.

Figure 6:
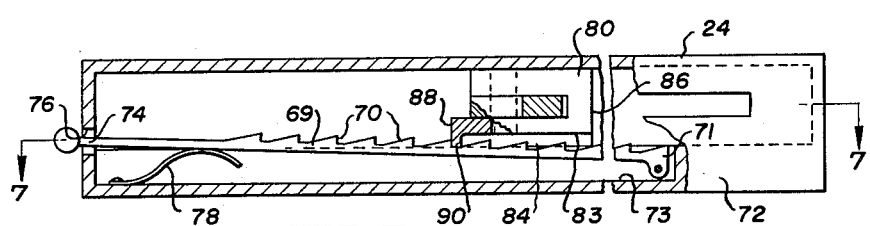
FIGURE 6 is a view similar to FIGURE 2 of an alternate embodiment of the invention.
Figure 7:
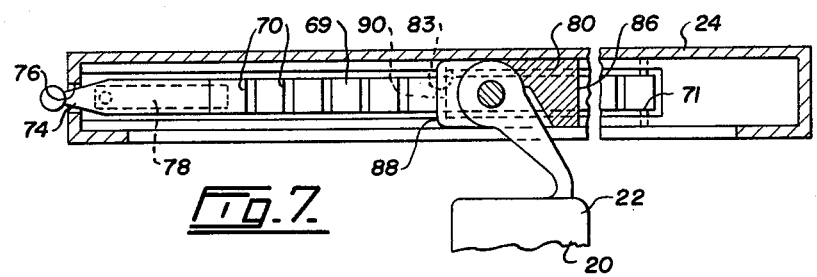
FIGURE 7 is a sectional view taken along line 7—7 of FIGURE 6.

FIGURES 6 and 7 illustrate an alternate means of selectively securing the outer end 22 of the safety bar 20 in the housing. In this embodiment, a ratchet rack 69, having upwardly projecting teeth 70, is secured at its inner end 71 at the housing 72 on a lower surface 73 thereof by its outer end 74 projecting outwardly through an aperture 76 in the forepart of the housing 24. A spring 78 is mounted in the housing between the ratchet rack 69 and said lower surface 73 of the housing near the aperture 68, said spring 78 normally urging the outer end 74 of the said rack upwardly. In this example, a runner 80 is provided with a longitudinal slot 83 formed in a lower face 84, said slot being in alignment with and slightly wider than the ratchet rack 69 and running forwardly from the after end 86 of the runner to but not through the front face 88 thereof, thereby forming a downwardly projecting lug 90. It will be seen by referring to FIGURE 6, that when the ratchet rack 69 lies in its normally urged upward position, the ratchet teeth 70 will engage the lug 90, thereby restraining the runner 80 from forward movement relative to the rack. When the outer end 74 of the rack is depressed, the ratchet teeth 70 will disengage from the lug 90, thus permitting the runner 80 to be selectively positioned at any point in the housing. When the outer end 74 is released, the ratchet rack 69 will return to its normal upward position again, locking the runner 80 against forward movement.

Although the foregoing description provides for the ratchet rack 69 being mounted to act upwardly of the housing 72 it is not the intention to limit it to this position or it may be mounted on the side or top of said housing.

The foregoing illustrates only two methods, whereby the runner may be selectively positioned longitudinally between the housing. However, it is apparent that many devices may be used for this purpose, the two forms described, however, are easy to operate and may be inexpensively manufactured and installed.

What I claim as my invention is:

1. An adjustable passenger safety guard for a vehicle comprising an elongated horizontally disposed housing being adapted to be mounted on an inner side wall of said vehicle adjacent a seat thereof in a fore and aft position, a runner in the housing longitudinally slidable therein and having a wedging face, a wedging block slidably mounted in the housing forwardly of the runner having a wedge-shaped after face adapted to coact with the wedging face of the runner, thereby securing said runner against forward movement relative to the housing, a safety bar pivotally connected at one end to the runner, said safety bar being adapted to lie in a position parallel to and above the seat in a normal open position and being adapted to be swung forwardly against and parallel to the side wall when not in use.

2. An adjustable passenger safety guard as claimed in claim 1 including restraining means at the other end of the safety bar adapted to releasably secure said safety bar in said open position.

3. An adjustable passenger safety guard for a vehicle comprising in combination an elongated horizontally disposed housing being adapted to be mounted on an inner side wall of a door of said vehicle adjacent a seat thereof in a fore and aft position, a runner in the housing longitudinally slidable thereto, means to releasably secure the runner in any selected longitudinal position in the housing against forward movement relative thereto, a safety bar pivotally connected at one end to the runner, said safety bar being adapted to lie in a position parallel and above the seat in a normal open position and being adapted to be swung forwardly against and parallel to the side wall when not in use, a restraining arm having a forwardly opening fore and aft main slot and a plurality of forwardly angled interconnected branch slots formed in a vertical face thereto, secured in a fore and aft position parallel to and above the seat, the other end of the safety bar being slidably engageable with all of said branch slots whereby said other end of the safety bar is restrained from forward and upward movement, a door safety means on the said other end of the safety bar adapted to releasably engage the restraining arm thereby restraining said safety bar against movement in a direction normal to the side wall of the vehicle.

4. An adjustable passenger safety guard as claimed in claim 3 in which the restraining arm is hingedly secured to the vehicle, thereby permitting said restraining arm to be swung upwardly in relation to the seat and substantially normal thereto when not in use.

5. An adjustable passenger safety guard for a vehicle comprising in combination an elongated horizontally disposed housing adapted to be mounted on an inner side wall of a door of said vehicle adjacent a seat thereof in a fore and aft position, said housing having a longitudinal slot formed in an inner face thereof, a safety bar adapted to lie in a position horizontally parallel to and above said seat, a runner having a wedging face in the housing longitudinally slidable therein, said runner having a forward face, pivotal means carried by said runner outwardly of the housing through the slot pivotally connecting one end of the safety bar to the runner, thereby permitting said safety bar to be swung forwardly from said position horizontally parallel to and above the seat to a fore and aft position adjacent the housing, a wedging block in the housing and longitudinally slidable therein forwardly of said runner, having a wedge-shaped face adapted to coact with the wedging face of the runner, thereby wedging the runner in the housing against forward movement relative thereto, operating means carried by the wedging block outwardly of the housing operable to selectively position said wedging block in said housing, a restraining arm being adapted to be secured in a fore and aft position inwardly of the housing, means formed in the restraining arm adapted to releasably engage the said other end of said safety bar, thereby securing the safety bar in said position parallel to the seat, and a door safety means on the said other end of the safety bar adapted to releasably engage the restraining arm thereby restraining said safety bar against movement in a direction normal to the side wall of the vehicle.

6. An adjustable passenger safety guard as claimed in claim 5 in which the operating means comprises a shaft rigidly mounted on the wedging block and protruding outwardly of the housing through the slot therein.

7. An adjustable passenger safety guard as claimed in claim 5 including means to releasably secure the restraining arm upwardly of the seat when not in use.

8. An adjustable passenger safety guard for a vehicle comprising in combination an elongated horizontally disposed housing adapted to be mounted on an inner side wall of a door of said vehicle adjacent a seat thereof in a fore and aft position, a runner mounted in the housing longitudinally slidable therein, said runner having a longitudinally disposed slot in one face, a lug secured to the runner in said slot transversely disposed thereto, an elongated ratchet rack secured in the housing and disposed in alignment with the slot and adjacent the lug, resilient means normally urging the ratchet rack into engagement with the lug to restrain forward movement of the runner, means to release the ratchet rack from engagement with the lug, thereby permitting selective positioning of the runner relative the housing, a safety bar pivotally connected at one end to the runner, said safety bar being adapted to lie in a position parallel and above said seat in a normal open position and being adapted to be swung outwardly against said housing in a fore and aft position when not in use, the other end of said bar being forwardly of said one end, a restraining arm secured in a fore and aft position inwardly of the housing, means formed in the restraining arm to releasably engage the other end of the safety bar, thereby securing said safety bar in said position parallel to the seat, a door safety means on said other end of the safety bar adapted to releasably engage the restraining arm thereby restraining said safety bar against movement in a direction normal to the side wall of the vehicle.

References Cited in the file of this patent
UNITED STATES PATENTS

| | | |
|---|---|---|
| 296,975 | Lampton | Apr. 15, 1884 |
| 2,755,101 | Budde | July 17, 1956 |
| 2,805,081 | Frimet | Sept. 3, 1957 |
| 2,833,554 | Ricordi | May 6, 1958 |